Aug. 12, 1969  S. F. SNYDER  3,460,172
LEAD SCREW MACHINE TOOL
Filed June 13, 1966  7 Sheets-Sheet 4

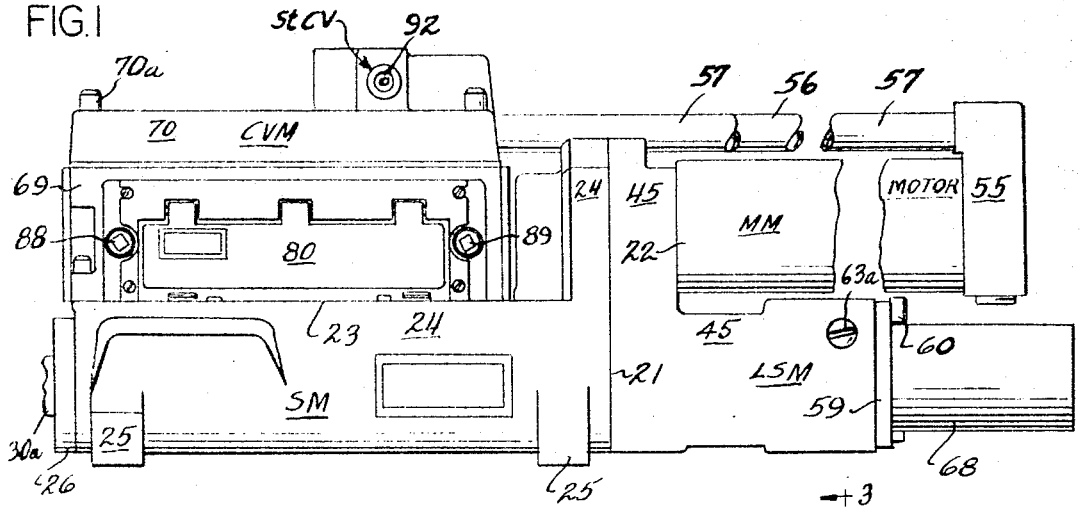

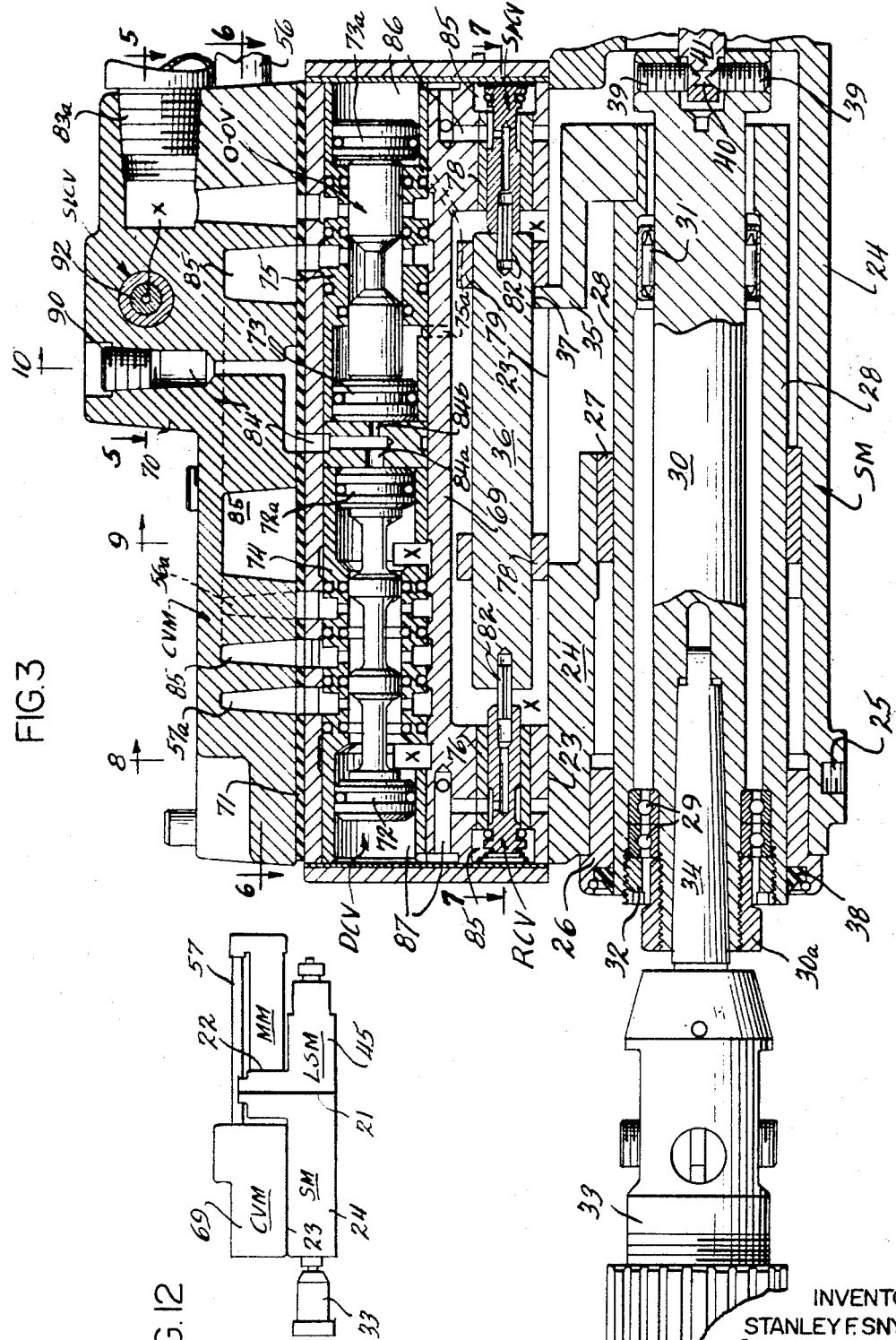

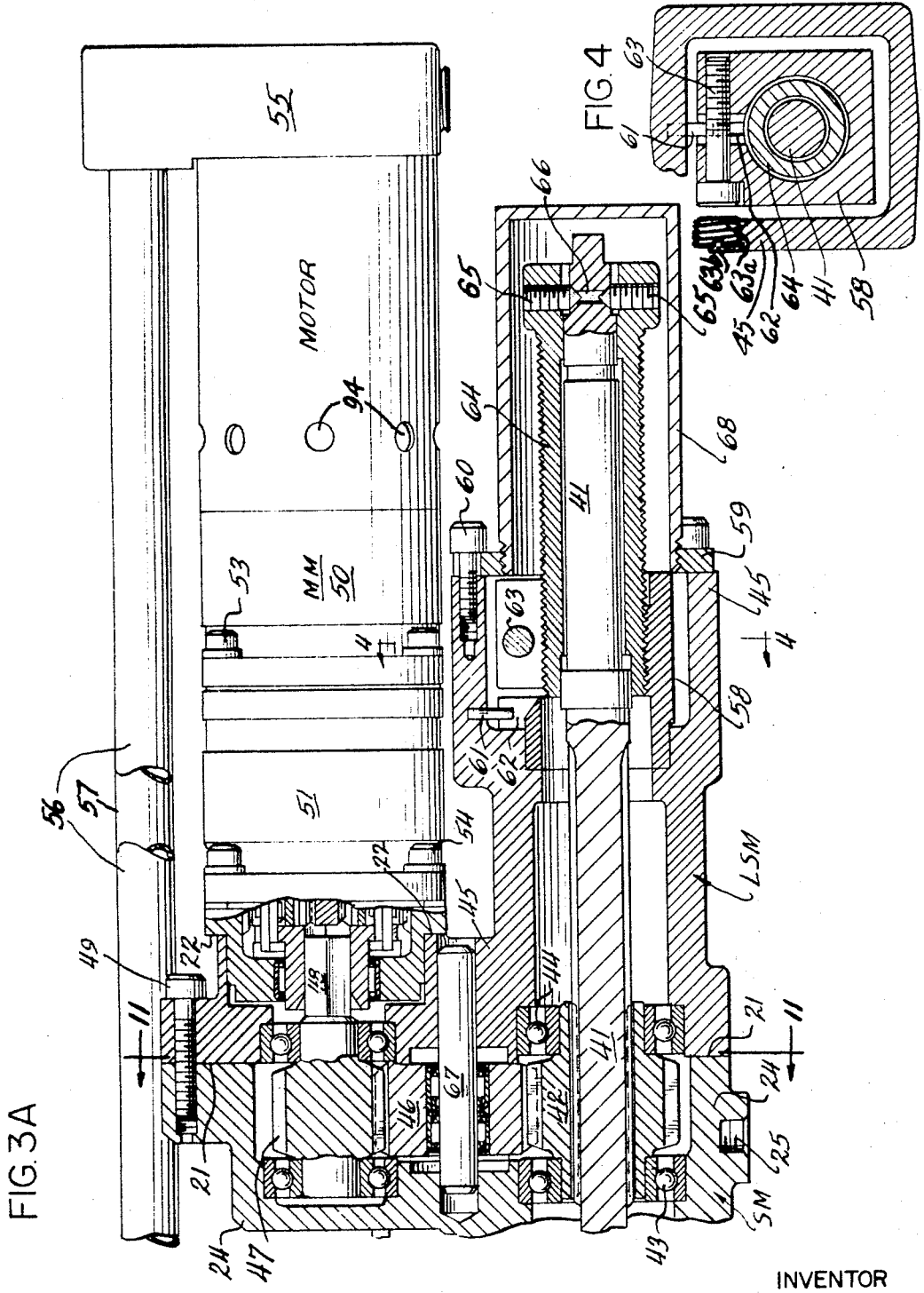

INVENTOR
STANLEY F. SNYDER
BY Bair, Freeman
& Molinare
ATTORNEYS

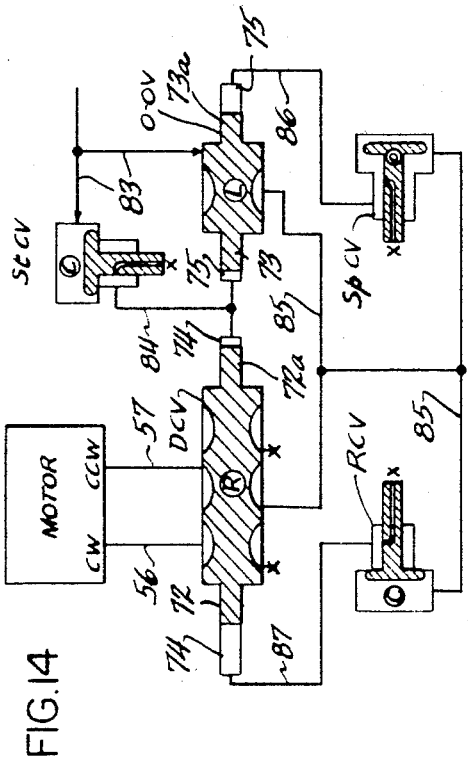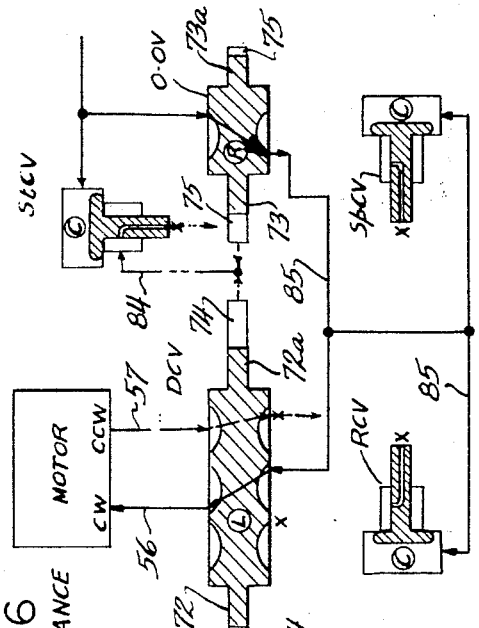

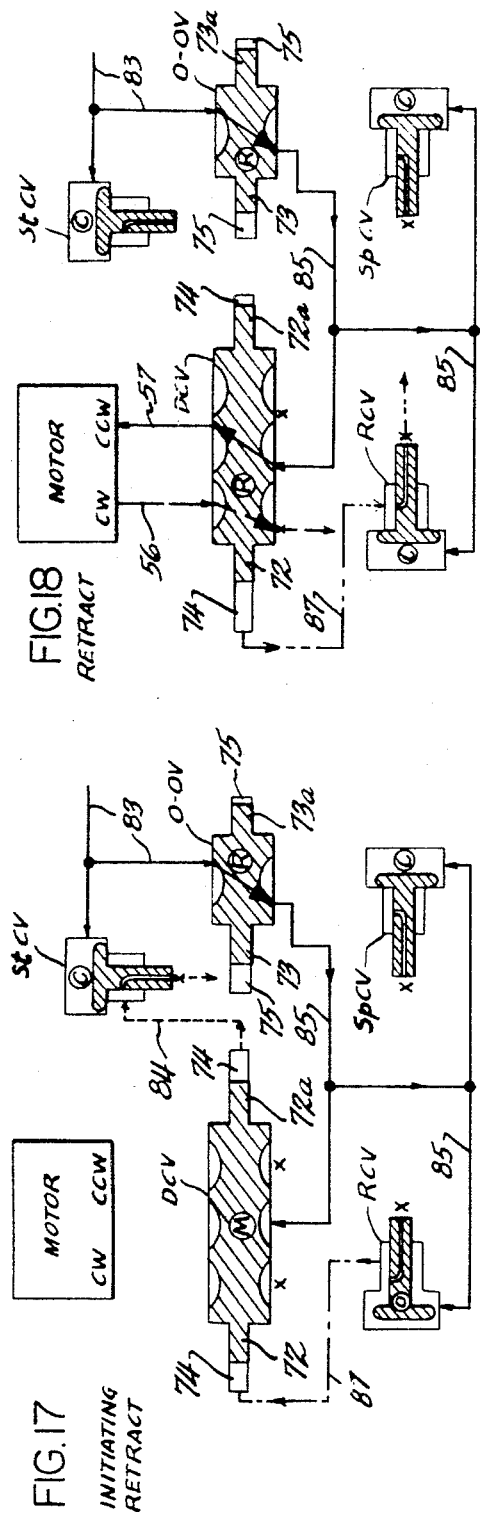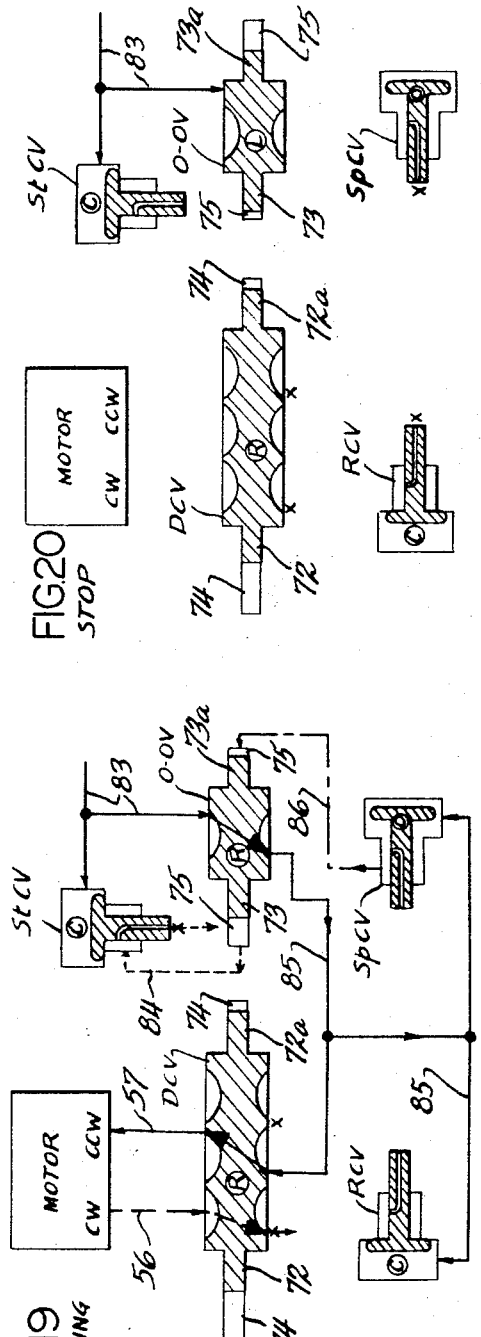

INVENTOR
STANLEY F. SNYDER
BY Bair, Freeman & Molinare
ATTORNEYS

United States Patent Office 3,460,172
Patented Aug. 12, 1969

---

3,460,172
LEAD SCREW MACHINE TOOL
Stanley F. Snyder, Bryan, Ohio, assignor to The Aro Corporation, a corporation of Delaware
Filed June 13, 1966, Ser. No. 557,113
Int. Cl. B23g 5/00, 1/16; B23b 47/22
U.S. Cl. 10—129                        10 Claims

ABSTRACT OF THE DISCLOSURE

A machine tool having a tool carrying spindle with lead screw means to advance the spindle and thereby the tool into the work. Novel no backlash means is provided for connecting the spindle to the lead screw through an intermediate shaft having no backlash connections at each end of the shaft. The machine tool is assembed in modules for convenience of individual module repair and any slight misalignment between modules is taken care of by the no backlash connections. The machine tool includes a valve module with manually selective and automatic controls for advance and retraction of the tool carried by the spindle. The controls include fluid pressure operated direction control and on-off valves, a start control valve, a retract control valve, and a stop control valve, the latter three operable to control the direction control and on-off valves by the supply of fluid under pressure thereto for actuating them.

---

This invention relates to a lead screw machine tool of efficient, compact design adapted to be actuated by compressed air and having a novel control arrangement.

One object of the invention is to provide a complete machine tool for lead screw tapping and the like which is made up of a separate modules comprising a lead screw module, a motor module, a spindle module, and a control and command valve module, the modules being separable to simplify maintenance procedures such as quick replacement of a module which is malfunctioning, and the modules being individual units whereby any one of them can be separately repaired or overhauled without disturbing the other modules. Because change of operation frequently requires changing the spindle speed and/or the lead screw pitch, the motor module and the lead screw module are placed at the rear of the tool, a point farthest from the work for maximum accessibility.

Another object is to provide a spindle and a lead screw mechanism which are in line with each other for maximum accuracy of spindle rotation and thrust capability, and wherein a novel no backlash connection is provided between a tool carrying spindle and a tool actuating shaft for rotating it and moving it axially, a similar no backlash connection being provided between a lead screw and the tool actuating shaft.

Still another object is to provide a motor module which has convenient means for assembling different gear units to obtain a variety of spindle speeds.

A further object is to provide a valve module containing all the control and command valves necessary for automatic operation of the machine tool for advance and retract throughout a complete cycle upon a starting control valve being manually depressed.

Still a further object is to provide control and command valves which may be automatically shifted for a complete cycle of operation depending upon the axial position of the spindle of the machine tool and the setting of trip tabs in accordance with the desired stroke of the spindle, but which may be manually over-ridden for stopping the machine tool during its automatic operating cycle to relieve jamming or to provide a desired manual type operation such as "jogging," i.e., driving a tap, retracting, redriving to a slightly greater depth, retracting, redriving to a slightly greater depth, retracting, and so on.

An additional object is to provide a valve module containing command and control valves, the valve module being mounted directly above the spindle module so the command valves may directly sense linear motion of the spindle and control it through proper motor functioning.

Another additional object is to provide a valve module which is unique in that the entire control system is fluid operated and designed to control a specific program of motor operation (tap, retract and stop) without the aid of any exterior controlled media, valve action being powered in the unit, and the command valves being in direct proximity to valve actuating pistons they serve, thus eliminating long and tortuous pressure circuits, decreasing the chance of fouling and increasing the operating efficiency.

A further additional object is to provide remote control for my lead screw machine tool which makes it possible to manually or automatically control any or all of the start, stop and retract functions from a distance as when the tool unit is inaccessible to the operator because of being mounted in a special fixture to perform a special operation, or when more than one of the tool units are to be simultaneously controlled by the operator.

With these and other objects in view, my invention consists in the construction, arrangement and combination of the various parts of my lead screw machine tool, whereby the objects above contemplated are attained, as hereinafter more fully set forth, pointed out in my claims and illustrated in detail on the accompanying drawings, wherein:

FIG. 1 is a side elevation of a lead screw machine tool embodying my invention;

FIG. 2 is an end elevation thereof, being the left-hand end of FIG. 1;

FIG. 3 is an enlarged sectional view on the line 3—3 of FIG. 2 showing the valve module and the spindle module of my lead screw machine tool;

FIG. 3A is a vertical sectional view, also on the line 3—3 of FIG. 2 and is a continuation of FIG. 3;

FIG. 4 is a detail sectional view on the line 4—4 of FIG. 3A;

FIG. 5 is a horizontal sectional view on the line 5—5 of FIG. 3;

FIG. 6 is a horizontal sectional view on the line 6—6 of FIG. 3;

FIG. 7 is a horizontal sectional view on the line 7—7 of FIG. 3;

Figure 8:
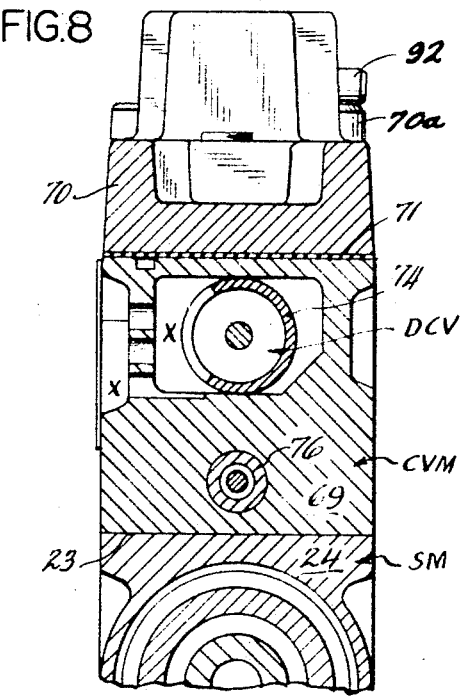
Figure 9:
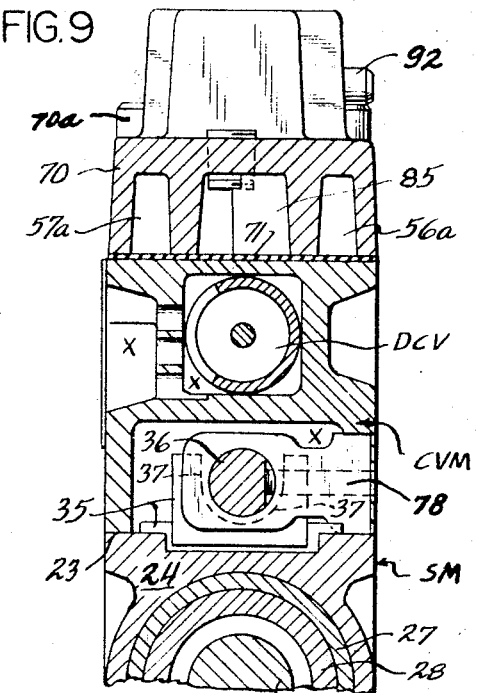
Figure 10:
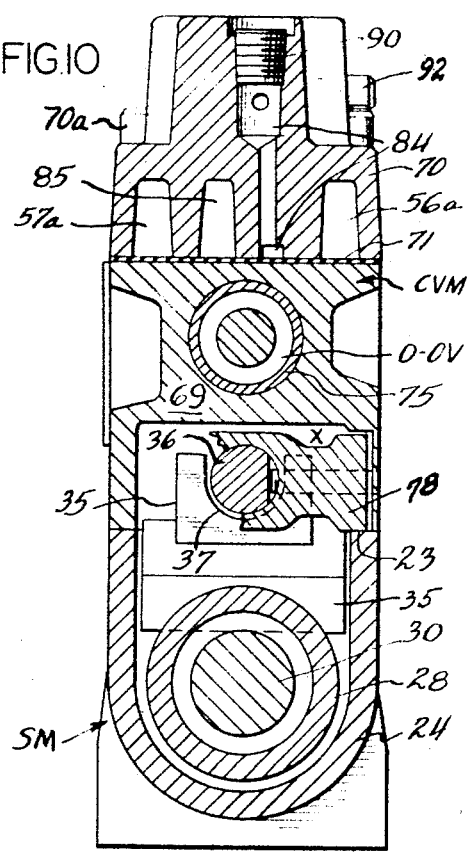
Figure 11:
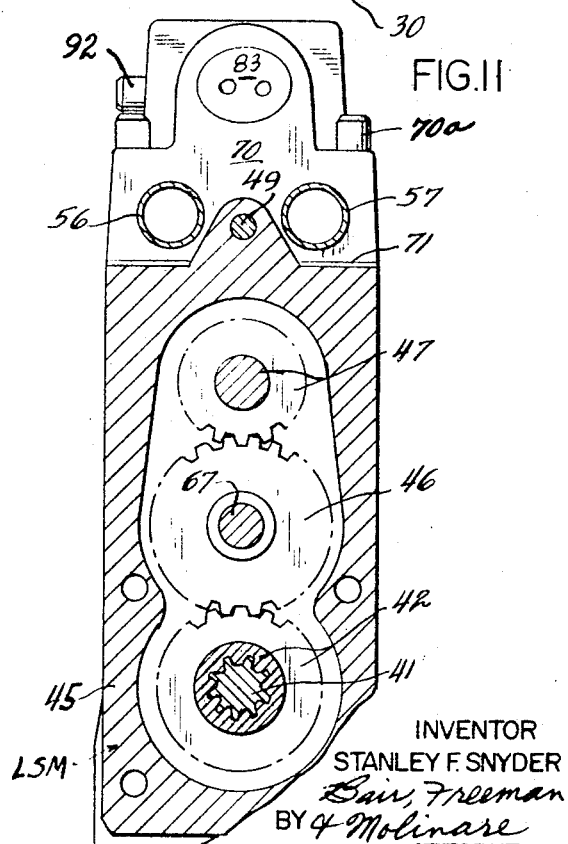

FIGS. 8, 9 and 10 are vertical sectional views on the lines 8—8, 9—9 and 10—10 respectively of FIG. 3;

FIG. 11 is a vertical sectional view on the line 11—11 of FIG. 3A;

FIG. 12 is a reduced side elevation of the complete tool to illustrate the four modules thereof;

FIG. 13 is a key to air lines shown in operational diagrams of FIGS. 15 to 20 inclusive;

FIG. 14 is an operational diagram showing the valves of my lead screw machine tool and air lines between them, most of which consist of cavities in the body of the control valve module;

FIGS. 15 to 20 inclusive are operational diagrams, and each operation being performed is indicated in a legend associated with the figure number.

Figure 21:
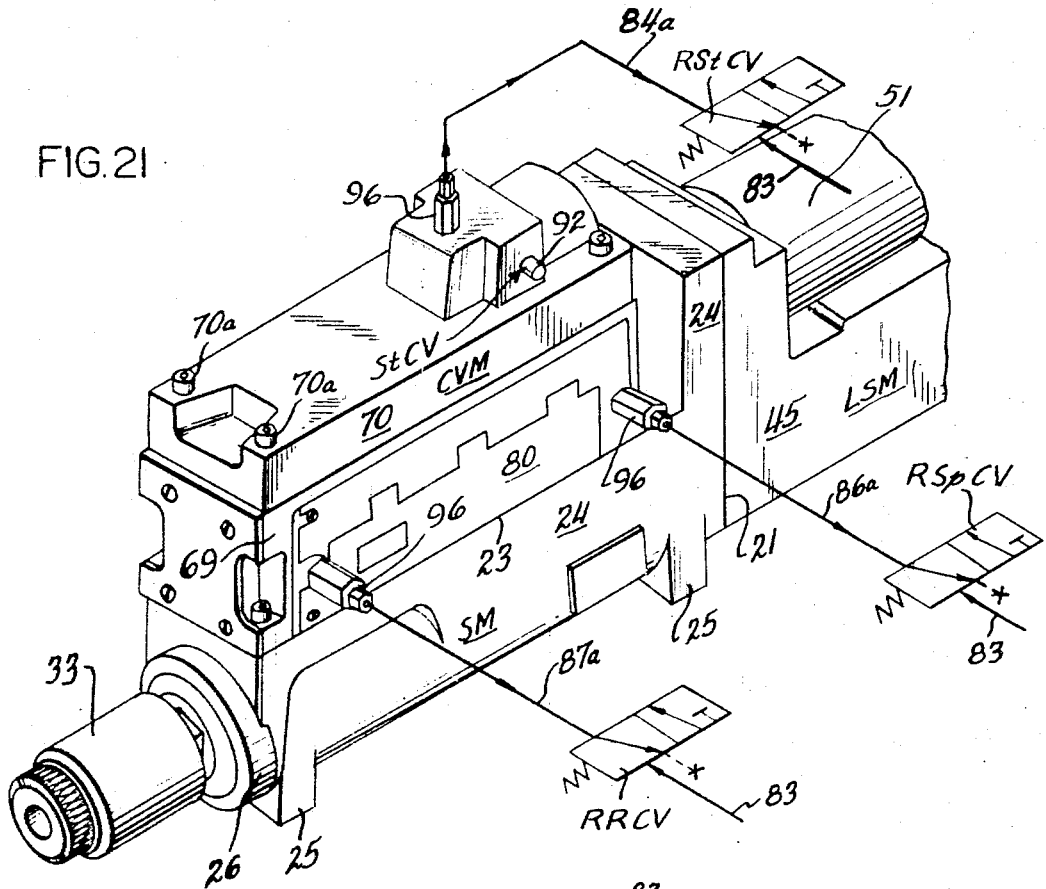
Figure 22:
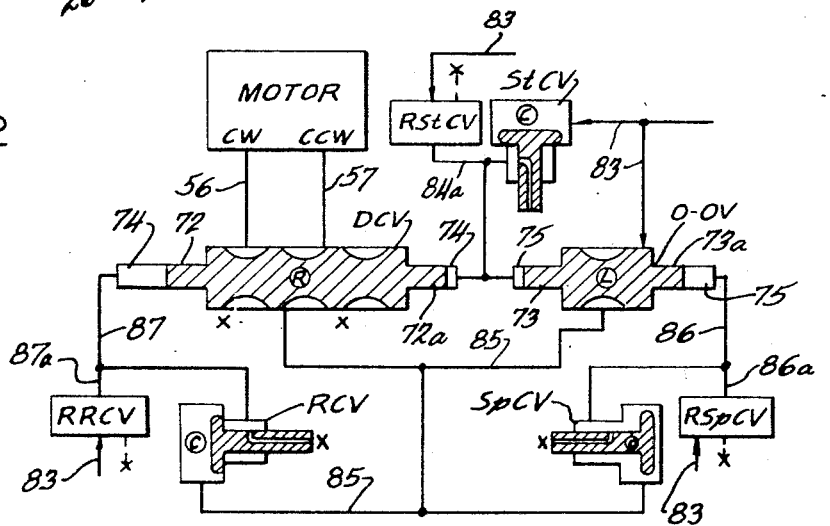

FIG. 21 is a perspective view of my lead screw machine tool showing diagramatically the connection of remote start, retract and stop command valves for controlling the tool from a distance; and FIG. 22 is an operational diagram similar to FIG. 14 showing the addition of the remote control valves and their connection in the air line circuit.

On the accompanying drawings I have used a number of reference characters to indicate various elements of my lead screw machine tool as follows:

VALVES

DCV—Direction Control Valve
O-OV—ON-OFF Valve
RCV—Retract Command Valve
S*p*CV—Stop Command Valve
S*t*CV—Start Command Valve

OTHER ELEMENTS

LSM—Lead Screw Module
SM—Spindle Module
CVM—Control Valve Module
MM—Motor Module
(C)—Closed
(O)—Open
(R)—Right hand position
(L)—Left hand position
(M)—Mid-position
 (C, O, R, L and M in FIGS. 14–20 only)

As shown in FIG. 12 my lead screw machine tool consists of four modules, CVM, MM, SM and LSM, which will each be described in detail. Parting lines 21, 22 and 23 are indicated which separate the modules from each other, and the manner in which the modules are held together will be described later.

SPINDLE MODULE (SM)

The spindle module SM comprises an elongated body 24, shown in FIGS. 3 and 3A, having foot mounts 25 for positioning dowel pins and mounting bolts in the usual way which serve as the prime locator for the unit with respect to a work table, jig or the like. Bushings 26 and 27 therein serve to support a sleeve 28 carrying bearings 29 for one end of a spindle 30, a needle bearing 31 being provided to support the other end thereof. The front end of the bushing 26 carries a wiper ring 38 for cutting oil and metal chips, preventing their entry into the bushing and adjacent internal cavities of the spindle module, the ring also serving as a seal.

The sleeve 28 is non-rotatable but axially movable in the bearings 26 and 27. The bearings 29 provide zero axial movement between the spindle 30 and the sleeve 28, being locked against an internal shoulder by a locknut 32. A chuck 33 is provided capable of grasping a cutting tool such as a tap and is mounted by means of a precision tapered shank 34 positioned in a companion tapered bore of the spindle 30.

Also contained within the spindle module SM is a valve actuating finger 35 to actuate certain valves in the valve module CVM in order to properly control motor response as will hereinafter appear. It is also the purpose of the finger 35 to act as an anti-rotational device for the sleeve 28 by paritally encompassing a valve actuating rod 36 as shown in FIGS. 9 and 10, the finger having a semi-circular seat 37 for this purpose.

The spindle 30 is provided at its rear end (see FIG. 3 lower right corner) with an enlargement containing a pair of pointed set screws 39, the points of which enter into a cross hole 40 in a shaft 41. The hole is cross-drilled on chordal flats of the shaft and has its opposite ends countersunk. This type of connection provides a rigid, zero backlash drive for axial and rotational motion of the spindle 30 simultaneously with the shaft 41.

Referring to FIG. 3A it will be seen that the shaft 41 is splined (also see FIG. 11) to slide in the splined bore of a drive gear 42. The gear 42 is journaled in bearings 43 and 44, the bearing 43 being located in the housing 24 and the bearing 44 being located in a lead screw housing 45 suitably secured to the housing 24 by bolts 49 or the like. The housings 24 and 45 are on opposite sides of the parting line 21. Also contained within the housing 45 is an idler gear 46 meshing with the drive gear 42 and with a drive gear 47, the latter having a square shank 48 to be driven by a "MOTOR" (so labeled in FIG. 3A) as will hereinafter appear. Suitable bearings as illustrated and a pin 67 are provided for journaling the gears 46 and 47. The pin 67 also serve the purpose of a prime center line locator as between the housings 24 and 45.

MOTOR MODULE (MM)

The motor module MM comprises the motor and a pair of planetary gear units 50 and 51, the latter reducing the speed of the motor (which is of the usual reversible pneumatic vane type) to a speed suitable for rotation of the chuck 33. In this respect it will be noted that the planetary gear unit 50 is bolted to the unit 51 by bolts 53 and unit 51 is bolted to the lead screw housing 45 by bolts 54.

A plurality of the units 50 and 51 may be provided having different gear ratios so that various combinations of them as well as combinations omitting one of the planetary gear units for relatively fast rotation may be assembled for a particular job without disturbing the spindle, lead screw and valve modules. Thus, interchangeable motor modules, each having a different combination of gear ratios in one or two planetary gear units may be provided as preassemblies and interchanged to operate the lead screw machine tool at various speeds depending on requirements for a particular job and necessitating only the removal on one preassembly by unscrewing the bolts 54 and substitution of another as required.

The motor also includes a head 55 to which pipes 56 and 57 extend to carry air for clockwise and counter-clockwise rotation as will hereinafter appear.

LEAD SCREW MODULE (LSM)

The lead screw module LSM is especially useful when using my machine tool as a lead screw tapper although it is quite useful as an automatic feed for drilling, reaming, countersinking and the like. It comprises the lead screw housing 45 having a lead nut 58 therein (see FIG. 3A) which is held by a plate 59 and cap screws 60 against longitudinal movement relative to the housing 45. The lead nut is held against rotation by a pin 61 in a slot 62 of the nut. The lead nut 58 is split and a clamp screw 63 tends to contract the nut for taking up play between its threads and those of a lead screw 64 which is in the form of a sleeve surrounding a portion of the shaft 41 as shown. The lead screw has an enlargement provided with a pair of pointed set screws 65 adapted to enter opposite countersunk ends of a hole 66 crossdrilled on chordal flats of the shaft 41 and this connection also provides a rigid zero backlash drive for axial and rotational motion of the shaft 41 simultaneously with the lead screw 64.

The housing 45 serves to cap the open portion of the spindle housing 24 and locate the bearing 44, and act as a mount for the motor module MM. A closed-end tube 68 is carried by the plate 59 to enclose the end of the shaft 41 and the lead screw 64 surrounding it. This construction permits ready change of the lead screw and lead nut assembly by removing the cap screws 60 whereupon the plate 59 and the tube 68 may be removed and the set screws 65 loosened. The lead screw 64 and the lead nut 58 may then be removed as a unit and another unit having a different pitch to match a new tap being accommodated can be substituted whereupon the plate 59 and the tube 68 are secured back in position by means of the cap screws 60.

Also within the housing 45 is a cover screw 63*a* serving to close a hole 63*b* to prevent contamination of the lead screw and the associated parts from cutting oil, metal chips and the like which would otherwise enter the cavity within the housing 45. It is the purpose of the hole 63*b* to provide wrench access to the clamping screw 63 to adjust the tension of the lead nut 58 on the lead screw 63 while the unit is operating and without resorting to removal of the lead nut from the lead screw housing.

CONTROL (AND COMMAND) VALVE MODULE (CVM)

The valve module CVM comprises a body 69 mounted on top of the spindle housing 24 with a head 70 mounted thereon, a gasket 71 being interposed between the two as shown in FIG. 3. The head 70 is retained in position by cap screws 70a shown in FIG. 6. The direction control valve DCV, the ON-OFF control valve O-OV, the retract command valve RCV, and the stop command valve SpCV of the valve module are shown in FIG. 3, the first two in the form of spool valves and the last two in the form of poppet valves having O-ring seals. The spools are in cylinders 74 and 75 and the poppet valves are slidable in sleeves 76 and 78 as shown. A pair of pistons 72 and 72a actuate the spool of the valve DCV while a pair of pistons 73 and 73a actuate the spool of the valve O-OV in an obvious manner, the body 69 and the head 70 being provided with suitable cavities for connecting the various valves together according to the air line diagram shown in FIG. 14.

The spools of the valves DCV and O-OV are provided with suitable O-ring seals for air circuit separation. These are unsectioned in FIG. 3 to avoid confusion on the drawings. This applies to FIGS. 5 and 7 also. The valves DCV and O-OV remain where positioned by the pistons 72, 72a, 73 and 73a which also have O-ring seals.

The command valves RCV and SpCV are spring-closed, and adapted to be opened by longitudinal movements of the valve actuating rod 36 which in turn is actuated by the valve actuating finger 35 coacting with a pair of trip-tabs 78 and 79 which as shown in FIGS. 7, 9 and 10 are adjustably positioned on the valve actuating rod 36 by set screws 81. In FIG. 1 a door 80 is hinged at the top and may be swung open for gaining access to the set screws 81 to accomplish and to retain such adjustment. FIGS. 3 and 7 also show how the valve actuating rod 36 is piloted by the valves RCV and SpCV, guide pins 82 in the ends of the rod being used for this purpose. The pins are C-shaped in cross-section to permit escape of air from the command valves RCV and SpCV.

The valve module CVM includes the start command valve StCV shown in FIG. 5 which is also of the spring-closed, O-ring poppet type, and is in the nature of a push-button manual control as will hereinafter appear.

Referring to FIG. 14 an air line diagram is shown in which all the valves are in the stopped position of FIGS. 3 and 5. A supply line 83 connects to the ON-OFF valve O-OV and the start command valve StCV. In FIGS. 3, 3A, 5, 6, 7, 8, 9, 10 and 11 certain cavities of the valve body 69 and the head 70 receive compressed air from a source of supply and are designated with this reference numeral 83, and in FIG. 3 a fitting 83a, is shown to supply compressed air from a hose or the like.

Returning to FIG. 14, a plurality of secondary lines 84 to 87 inclusive are also shown whereas FIGS. 3, 3A, 5, 6, 7, 8, 9, 10 and 11 show the cavities corresponding thereto and bearing the same reference numerals. The pipes 56 and 57 are also shown in FIG. 14, the pipe 56 extending from the direction control valve DCV to the clockwise port CW of the motor and the pipe 57 extending therefrom to the counterclockwise port CCW thereof. The cavities within the head 70 that communicate with the pipes 56 and 57 are shown at 56a and 57a. FIG. 14 shows air out to atmosphere ($x$) for each of the valves except O-OV. This is also shown at $x$ in FIG. 5 for the start command valve, FIG. 7 for the retract command valve and the stop command valve, and FIGS. 8 and 9 for the direction control valve. The cylinder 75 is provided with pressure relief holes 75a to atmosphere, one for each of the pistons 73 and 73a as shown in FIG. 3.

PRACTICAL OPERATION (AUTOMATIC)

The normal operation of my lead screw machine tool, when used as a tapper for instance, has three separate phases.

1. TAP
2. RETRACT
3. STOP

Each of these phases will now be described, assuming the machine tool is supplied actuating fluid such as compressed air to the supply line 83, the parts of the tool being dormant or in the stopped part of the operating cycle as depicted in FIGS. 3, 3A, 5, 6, 7, 8, 9, 10 and 11, and as shown in FIGS. 14 and 20.

1. TAP

This phase is started as depicted in FIG. 15 and continued in FIG. 16. The start command valve StCV is manually shifted from the closed position of FIG. 14 to open position of FIG. 15. This valve includes a valve plunger 92 for this purpose. This opening of the start command valve sends control air through air line 84 to the right hand end of cylinder 74 and the left hand end of cylinder 75 as shown in FIG. 15 to shift the valve DCV to the left and O-OV to the right from their positions as shown in FIG. 14. The piston 72a moves to the left (FIG. 15) before the piston 73a moves to the right (FIG. 16), and the lapse of time between the movement of the two is due to the differential of areas in passageways 84a and 84b shown in FIG. 3. The greater area of 84a will allow the valve DCV to traverse before the valve O-OV moves, thus obtaining the correct directional function preceding the supply of compressed air to the motor through the valve O-OV. This assures that the chuck 33 will start with the proper direction of rotation (clockwise) when the motor is energized. At the same time the air present in the left hand end of the cylinder 74 and the right hand end of the cylinder 75 is displaced through the piping 87 and 86 respectively and through the valves RCV and SpCV, the air being exhausted through the slots in the C-shaped guide pins 82 of FIG. 3 to atmosphere at $x$. Wherever there is capability of discharge to atmosphere for the valves DCV, RCV, SpCV and StCV throughout the drawings, the designation $x$ is used.

When the valve O-OV has shifted to the right as in FIG. 16 air circuits are established as illustrated. The motor is driven clockwise by air from the source 83 passing through the now open valve O-OV, the midsection of the valve DCV and the pipe 56 to the clockwise port CW of the motor, whereas air is exhausted from the counter-clockwise port CCW of the motor through the pipe 57 and the right hand section of the valve DCV to atmosphere as illustrated. After the chuck 33 starts rotating, the operator releases the plunger 92 of the start command valve StCV by which time the valve SpCV has closed because of axial advance of the spindle 30. The air supply through the valve O-OV also travels to the valves RCV and SpCV but is blocked as both RCV and SpCV are closed. The control air in the piping 84 of FIG. 15 becomes exhausting control air in FIG. 16 through the valve StCV to atmosphere.

The motor rotates the spindle 30 and the lead screw 64 whereupon the lead screw traverses the lead nut 58 to move the spindle axially and the tap into the work. The spindle also moves the valve actuating finger 35 away from the trip tab 79 and toward the trip tab 78. During this operating sequence, primary exhaust air from the motor leaves through exhaust ports 94 shown in FIG. 3A but there is a secondary exhaust, a by-product of motor operation which is pumped out of the motor through its port CCW and which flows through the pipe 57 to atmosphere as explained. The forward motion of the spindle 30, the chuck 33, the tap or other tool held thereby, the shaft 41 and the lead screw 64 will continue until after such time as the valve actuating finger 35 contacts the trip tab 78 which was previously adjusted for the desired length of spindle travel.

2. RETRACT

After the point of contact of the finger 35 with the trip tab 78, the retract cycle starts or is initiated as depicted as in FIG. 17. The retract control valve RCV is shifted by such contact from the position of FIG. 16 through the position of FIG. 17 to the position of FIG. 18. In FIG. 17 the compressed air from the air line 85 which was blocked by the closed valve RCV in FIG. 16 now flows through the open valve RCV and the air line 87, thereby shifting the valve DCV to the right from the position of FIG. 16 to the position of FIG. 17. Air from ahead of the piston 72a will exhaust to atmosphere through the line 84 and the hole in the center of the plunger 92 of the valve StCV. When the valve DCV completes its shift as in FIG. 18, the air from line 85 will flow through the mid-section of the valve DCV and the pipe 57 to the counter-clockwise port CCW of the motor and primary air will be exhausted through the exhaust ports 94 of FIG. 3A directly to atmosphere while secondary exhaust air will flow from the clockwise port CW of the motor through the pipe 56 and the left hand section of the valve DCV to atmosphere as illustrated. The motion of the piston 72a to the right will continue until stopped by the closed end of the cylinder 74. At this time counter-clockwise rotation of the motor and thereby the drive system and the spindle are accomplished causing the lead screw and spindle to move rearward (to the right in FIGS. 3 and 3A).

During the retracting operation illustrated in FIG. 18 the movement of the spindle rearwardly will cause the valve actuating finger 35 to pull away from the trip tab 78 which allows the valve RCV to be closed by its spring. Control air contained in the piping 87 of FIGS. 7–17 becomes exhausting control air in FIG. 18 through RCV to atmosphere.

The retract cycle can be initiated at any time during a tap cycle by manually depressing the trip tab 78 (moving it toward the left in FIG. 3), the trip tabs being exposed for this purpose when the door 80 is lifted. Such exposure is evident from an inspection of FIG. 7. The tap cycle may be re-initaited at any time during the retract cycle by manually depressing the valve plunger 92 of the valve StCV.

3. STOP

As the motion of the valve actuating finger 35 continues rearward (to the right) it will carry with it the trip tab 79 and the valve actuating rod 36, thus opening the valve SpCV as shown in FIG. 19. The opening of this valve permits air from the line 85 to flow through the line 86 into the right hand end of the cylinder 75 to act on the piston 73a and shift the valve O-OV to the left from the position of FIG. 19 to the position of FIG. 20, air in the left hand end of the cylinder 75 being exhausted ahead of the piston 73 through the line 84 and the valve StCV to atmosphere. When the valve O-OV assumes the STOP position shown in FIG. 20, air no longer flows from the line 83 to the line 85 and accordingly the motor stops and all air lines except the supply line 83 are exhausted of air. The parts are now in the position for the next starting cycle initiated according to FIG. 15 as hereinbefore described.

Automatic operation may be over-ridden by manually actuating either of the trip tabs, 78 for retract or 79 for stop, after swinging the cover 80 upwardly. This may be necessary during the tap or retract cycle to stop the tool for the purpose of relieving jamming or the like. In order to restart in the retract mode, the retract system is first opened by moving the trip tab 78 to the left in FIG. 7 and then the start control valve StCV is punched while still holding the tab 78 to the left. The resulting tool motion will be forward for a short duration with an almost instant retracting motion ensuing, after which the tab 78 can be released thereby closing the retract system.

One advantageous feature of my machine tool resides in the source of supply for the stop command valve SpCV. The source to power the action which results from actuating the stop command valve comes from within the valve module, specifically from the valve O-OV. This provides the effect of the valve SpCV actually shutting its source off by achieving its purpose or function. Were it not for this arrangement the source would emanate from outside the valve O-OV and supply pressure constantly to the right-hand end of the cylinder 75 so long as the valve module is connected to the fluid source such as 83 (or 83a–FIG. 3). In this condition the machine tool could not be restarted without the aid of differential piston areas on the valve O-OV, or an expensive and complicated "recycling" type valve would have to be provided for the valve SpCV.

Referring to FIGS. 3 and 10, the secondary line 84 has a plug 90, and in FIG. 1 the secondary lines 86 and 87 are shown as having plugs 89 and 88 respectively. These plugs are provided for remote control in accordance with FIGS. 21 and 22. The three plugs are removed and in place thereof three check fittings 96, opening away from the machine tool, may be installed in case remote control of the machine tool is desirable. Air lines 84a, 86a and 87a extend from the three fittings 96 as shown in FIGS. 21 and 22 to a remote start command valve RStCV, a remote stop command valve RSpCV, and a remote retract command valve RRCV which are adapted to control the start, retract and stop functions of the machine tool from a remote point. The remote command valves are normally in the positions shown in FIG. 21 to exhaust air from the air lines 84a, 86a and 87a, and when manually shifted against the bias of their return springs they supply air to the air lines just enumerated in the same manner that the start command valve, the retract command valve and the stop command valve of FIG. 14 do according to the operation as above described. The purpose of each check fitting 96 is to freely pass incoming signal air from the remote command valve but check any internally generated signal from leaving through the remote system. Thus, when adapted for remote control of any or all functions, the machine tool will still follow its normal automatic sequence of tap, retract and stop, and if necessary may be also manually actuated at the unit with assurance of proper reaction from the tool. The remote signals flow into the valve module at points interposed between the actuating pistons for the valves DCV and O-OV and also to the command valves of the valve module which are normally closed. The remote signals will tend to flow to exhaust through the command valves but the exhaust from them is small enough to check the signal flow adequately to afford thrust to the pistons, thereby actuating the valves DCV and O-OV for their intended functions.

With remote control of the type just described the machine tool can be programmed to any operational sequence desired, and can be a program initiator for any sequence desired. Where the lines 84a, 86a and 87a are relatively short, the check fittings can be eliminated.

From the foregoing specification it will be obvious that the arrangement of specific modules simplifies maintenance procedures, makes easy the changing of motor speeds and allows ready change of the lead screw and nut to suit the tapping job or other work being performed. The modules are designed and connected with the possibility of removing any one of them for maintenance without disturbing the other modules or the mounting of the machine tool as a whole. Because change of operation frequently requires changing the spindle speed and/or the lead screw pitch, the motor portion and lead screw portion were chosen to be placed at the rear of the tool, a point farthest from the work, for maximum accessibility.

Maximum accuracy of spindle rotation and feed is obtained by having the lead screw in line with the spindle. The strongest thrust transmitting capability is also found in this arrangement.

The valve module containing the command and control valves is mounted directly above the spindle module so the command valves may directly sense linear motion of the spindle and control it through proper motor functioning.

The valve module provides an entire control system which is fluid operated and designed to control a specific program of motor operation such as tap, retract and stop, without the aid of any exterior control media. Critical valve actions such as retract and stop, are powered by fluid pressure within the unit, and the command valves are in direct proximity to the pistons they serve, thus eliminating long and tortuous circuits, decreasing the chance of fouling and increasing the operating efficiency.

Some changes may be made in the construction and arrangements of the parts of my lead screw machine tool without departing from the real spirit and purpose of my invention, and it is my intention to cover by my claims any modified forms of structure of use of mechanical equivalents which may reasonably be included within their scope.

I claim as my invention:

1. A lead screw machine tool comprising, in combination, four disconnectable modules including a spindle module, a lead screw module, a motor module and a control valve module;

said spindle module including a body, a sleeve mounted for translational movement along an axis in said body, said sleeve also including a fixed finger extending transversely therefrom for cooperation with said control valve module, a spindle mounted in said sleeve to rotate about said axis with a chuck attached to one end of said spindle, a splined shaft extending from the opposite end of said spindle for connection with said lead screw module, said splined shaft being driven by a gear train which includes a gear on said splined shaft having a splined bore and at least one idler gear with a shaft pin extending parallel to said axis and from said body;

said lead screw module including a housing attached to said spindle module body, said housing adapted to receive said shaft pin to provide for module alignment when said housing and body are attached together, said housing having a lead screw nut fixed therein with a lead screw therethrough, said lead screw being attached to said shaft and rotatable about said axis;

said motor module being attached to said lead screw module in position to engage and drive said gear train, said motor module including a fluid powered motor; and said control valve module being removably mounted on said spindle module and engaged by said fixed finger of said spindle module for actuation of control valves comprising said control valve module in response to the position of said sleeve, said control valve module including a fluid power input line and fluid power output lines to said motor module.

2. The lead screw machine tool of claim 1 including a split lead nut in said housing, said lead screw being threaded in said lead nut, means for contracting said split lead nut around said lead screw for taking up play between the threads of said lead nut and said lead screw, and means constraining said lead nut against rotary and longitudinal movement in said housing.

3. The lead screw machine tool in accordance with claim 1 wherein said lead screw is hollow, with said shaft extending threthrough and projecting therefrom toward said spindle, and hole-and-pointed-set screw means are provided connecting the ends of said shaft to said lead screw and said spindle.

4. A lead screw machine tool in accordance with claim 3 wherein said connection between said shaft and said lead screw comprises a cross hole having countersunk ends and screws, said screws having pointed ends seated in said countersunk ends of said cross hole.

5. The lead screw machine tool of claim 1 wherein said control valve module includes a fluid pressure operated direction control valve connected with said output lines to select the direction of rotation of said motor and thereby said spindle, a fluid pressure operated on-off valve to supply air through said direction control valve to said motor, and a start command valve on said input line to shift said direction control valve from reverse to forward and to shift said on-off valve to on position to thereby supply fluid pressure through said direction control valve to said motor.

6. A lead screw machine tool in accordance with claim 5 wherein said direction control valve remains in forward and reverse positions when shifted thereto, a retract command valve provided to shift said direction control valve from forward to reverse, and a stop command valve provided to shift said on-off valve from on to off, said fixed finger of said spindle module operative to engage said retract command valve and said stop command valve.

7. A lead screw machine tool in accordance with claim 6 wherein said retract command valve and said stop command valve are manually actuatable to override the actuation thereof by said actuating means.

8. A lead screw machine tool in accordance with claim 6 wherein said start command valve is operable when actuated to shift said direction control valve from reverse to forward and to shift said on-off valve from off to on to initiate actuation of said motor and thereby said spindle in a tool advance direction.

9. A lead screw machine tool in accordance with claim 6 wherein said stop command valve is operable when engaged by said finger to shift said on-off control valve from on to off to thereby terminate operation of said motor and operation of said spindle in a tool retract direction.

10. A lead screw machine tool in accordance with claim 6 wherein said retract command valve is operable when engaged by said finger to shift said direction control valve from forward to reverse for reversing the energization of said motor and thereby causing movement of said spindle in a tool retract direction.

References Cited

UNITED STATES PATENTS

| | | | |
|---|---|---|---|
| 3,200,425 | 8/1965 | Vickers | 10—139 XR |
| 3,013,285 | 12/1961 | Arengo | 77—34 |
| 2,927,486 | 3/1960 | Robinson et al. | 77—34 |
| 2,893,272 | 7/1959 | Linsker | 77—34.4 XR |
| 2,869,403 | 1/1959 | Bent | 77—34 |
| 2,791,922 | 5/1957 | Robinson | 77—34 |
| 2,293,882 | 8/1942 | Batchelder | 287—52 |
| 872,883 | 12/1907 | Adams | 287—53 |
| 2,913,934 | 11/1959 | Quackenbush | 77—34.4 XR |
| 439,660 | 11/1890 | Holmquist | 90—22 XR |
| 708,881 | 9/1902 | Hervey | 77—34.4 XR |

FRANCIS S. HUSAR, Primary Examiner

U.S. Cl. X.R.

77—34; 90—22; 287—52